United States Patent
Wu

(10) Patent No.: US 9,983,649 B2
(45) Date of Patent: May 29, 2018

(54) BATTERY-DRIVEN ELECTRONIC DEVICE

(71) Applicant: UNIVERSAL SCIENTIFIC INDUSTRIAL (SHANGHAI) CO., LTD., Shanghai (CN)

(72) Inventor: Hann-Dong Wu, Caotun Township, Nantou County (TW)

(73) Assignee: UNIVERSAL SCIENTIFIC INDUSTRIAL (SHANGHAI) CO., LTD., Shanghai (CN)

(*) Notice: Subject to any disclaimer, the term of this patent is extended or adjusted under 35 U.S.C. 154(b) by 392 days.

(21) Appl. No.: 14/789,695

(22) Filed: Jul. 1, 2015

(65) Prior Publication Data

US 2016/0226260 A1    Aug. 4, 2016

(30) Foreign Application Priority Data

Feb. 4, 2015   (CN) .......................... 2015 1 0057270

(51) Int. Cl.
*G06F 1/30* (2006.01)
*H02J 7/00* (2006.01)
*G06F 1/32* (2006.01)

(52) U.S. Cl.
CPC .............. *G06F 1/30* (2013.01); *G06F 1/3212* (2013.01); *H02J 7/0031* (2013.01); *H02J 7/0063* (2013.01); *H02J 2007/004* (2013.01); *H02J 2007/0067* (2013.01); *Y02B 60/1292* (2013.01); *Y02D 10/174* (2018.01)

(58) Field of Classification Search
CPC ........................................................ G06F 1/30
USPC .......................................................... 307/31
See application file for complete search history.

(56) References Cited

U.S. PATENT DOCUMENTS

| | | | | |
|---|---|---|---|---|
| 5,561,363 A | * | 10/1996 | Mashino | H02J 1/14 322/25 |
| 5,710,931 A | * | 1/1998 | Nakamura | G06F 1/3203 307/66 |
| 6,066,899 A | * | 5/2000 | Rund | H02J 7/0031 307/10.7 |
| 6,744,698 B2 | * | 6/2004 | Koyama | G04G 19/08 320/132 |

* cited by examiner

*Primary Examiner* — Joseph Chang
(74) *Attorney, Agent, or Firm* — Muncy, Geissler, Olds & Lowe, P.C.

(57) ABSTRACT

A battery-driven electronic device includes a battery for outputting a battery voltage, a plurality of loads, a system unit, and a battery energy manager which is electrically connected with the battery, the loads and the system unit. The battery energy manager is adapted for detecting the battery voltage and set with a cutoff threshold, and a low-voltage threshold higher than the cutoff threshold. When the battery voltage is equal to or lower than the low-voltage threshold, the battery energy manager stops supplying power from the battery to at least one of the loads, and outputs a suspension command for the system unit to perform suspension process. When the battery voltage is equal to or lower than the cutoff threshold, the battery energy manager stops supplying power to the loads and the system unit.

4 Claims, 3 Drawing Sheets

BATTERY-DRIVEN ELECTRONIC DEVICE

BACKGROUND OF THE INVENTION

1. Field of the Invention

The present invention relates to electronic devices driven by batteries, and more particularly to a battery-driven electronic device that helps to maximize battery life.

2. Description of Related Art

Portable electronic devices are typically powered by batteries. In a conventional portable electronic device, a battery-managing circuit is usually such set that when the voltage of the battery is lower than 3.5V, or there is only 5-10% power capacity remaining in the battery the portable electronic device is made to suspend any unsaved data, so as to prevent these data from loss when the device is suddenly shut down due to low power.

The conventional portable electronic device is set to automatically suspend unsaved data in the event of the low battery voltage (namely 5-10% battery capacity). However, the remaining 5-10% power can still support the portable electronic device to operate for a certain time period, and there is no existing means to effectively use the remaining power.

Setting the low-power threshold of the battery to 0% may lead to malfunction of the portable electronic device, making this approach unfeasible to making the full use of the battery life.

When a portable electronic device is provided with a detachable battery door for easy replacement of batteries, unintentionally opening the battery door may cause one or more batteries to come off the portable electronic device and cause data loss as an accident. Such a data loss may in turn lead to serious and expensive damage, especially when it comes to industrial use, and is thus unacceptable.

BRIEF SUMMARY OF THE INVENTION

In view of the shortcomings of the prior art, the present invention provides a battery-driven electronic device that maximizes battery life by fully using the power capacity of its battery, and automatically performs a data suspension process when the battery is removed from the battery-driven electronic device, so as to prevent data loss.

For achieving the foregoing objective, the disclosed battery-driven electronic device comprises a battery, a plurality of loads, a system unit, and a battery energy manager. The battery outputs a battery voltage. The battery energy manager is connected with the battery, the loads, and the system unit, and detects a battery voltage, and has a low-voltage threshold and a cutoff threshold. The low-voltage threshold is higher than the cutoff threshold. When the battery voltage is equal to or lower than the low-voltage threshold, the battery energy manager stops supplying power from the battery to at least one of the loads and outputs a suspension command that makes the system unit to perform a suspension process. When the battery voltage is equal to or lower than the cutoff threshold, the battery energy manager stops supplying power to the loads and the system unit.

The battery energy manager to set the low-voltage threshold as close to the lowest possible battery voltage (i.e. 0 V), and prevents the battery-driven electronic device from malfunction related to the setting, thereby maximizing the battery's discharge.

Preferably, the battery energy manager comprises a switch, a first voltage detecting unit, and a second voltage detecting unit. The switch is connected with the battery and the system unit. The first voltage detecting unit and the second voltage detecting unit detect the battery voltage, respectively. The first voltage detecting unit stops supplying power to at least one of the loads and outputs the suspension command to make the system unit perform the suspension process when the battery voltage is equal to or lower than the low-voltage threshold. The second voltage detecting unit controls the switch to cut off, so as to form an open circuit between the battery and the system unit when the battery voltage is equal to or lower than the cutoff threshold.

Preferably, the battery energy manager further comprises a filtering unit that is connected between the battery and the first voltage detecting unit, for filtering out transient voltage drop, so as to prevent malfunction.

Preferably, the battery-driven electronic device further comprises a battery door and a battery door detector that is connected with the battery. The battery door detector, when the battery door is opened, outputs a suspension command to make the system unit perform the suspension process. The battery energy manager further comprises an AND gate unit that has an input end and an output end. The input end is connected with the system unit, the battery door detector, and the first voltage detecting unit. The output end is connected with the loads and the system unit. When the battery door is opened, the battery door detector notifies the system unit to suspend data, thereby allowing the system unit to successfully suspend data with sufficient time and power.

The invention as well as a preferred mode of use, further objectives and advantages thereof will be best understood by reference to the following detailed description of illustrative embodiments when read in conjunction with the accompanying drawings.

DETAILED DESCRIPTION OF THE INVENTION

The following preferred embodiments when read with the accompanying drawings are made to clearly exhibit the above-mentioned and other technical contents, features and effects of the present invention. Through the exposition by means of the specific embodiments, people would further understand the technical means and effects the present invention adopts to achieve the above-indicated objectives. However, the accompanying drawings are intended for reference and illustration, but not to limit the present invention.

Figure 1:
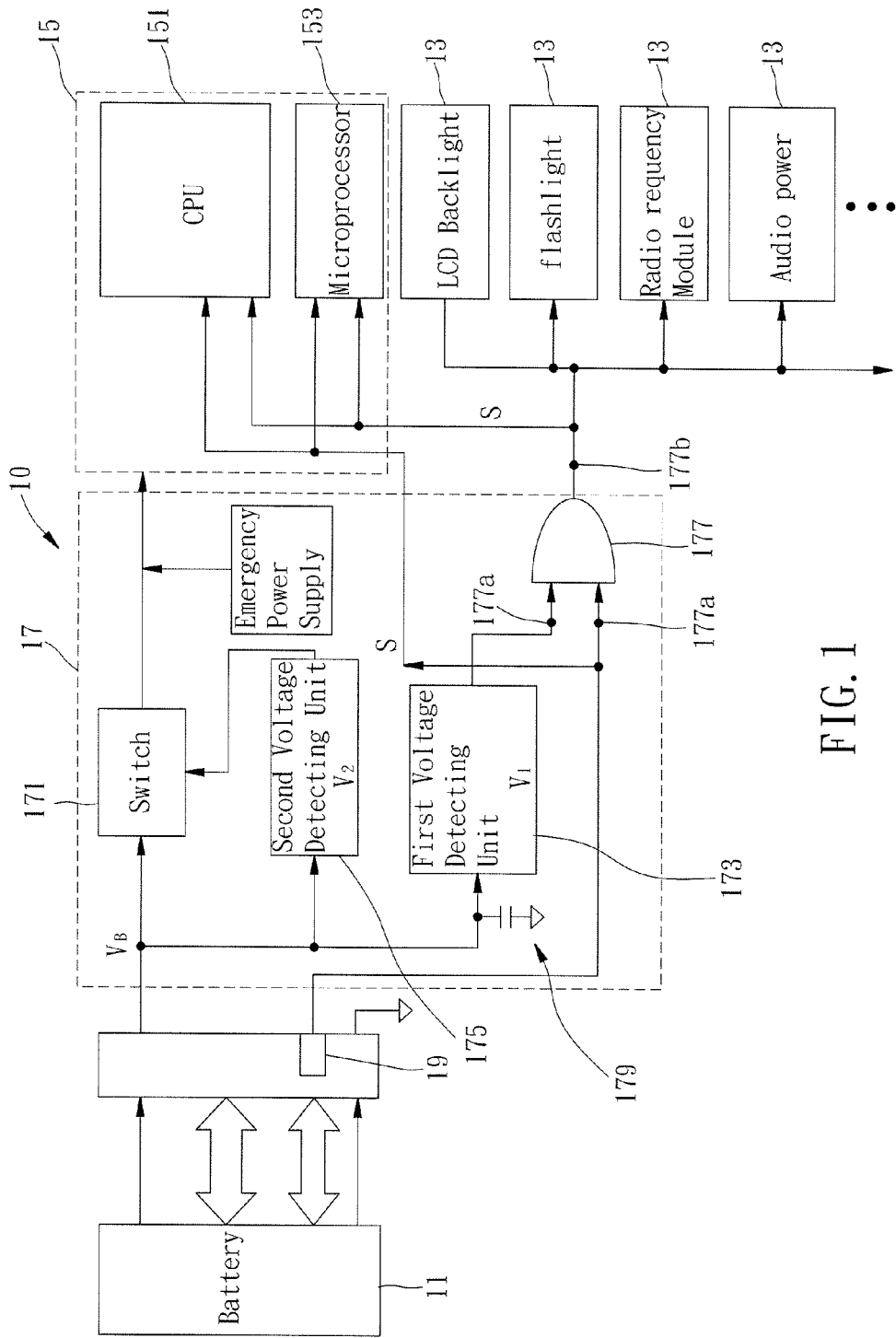
FIG. 1 is a block diagram of a battery-driven electronic device of the present invention.

As shown in FIG. 1, a battery-driven electronic device 10 of the present invention is, for example, a portable electronic device. The disclosed battery-driven electronic device 10 comprises a battery 11, a plurality of loads 13, a system unit 15, and a battery energy manager 17.

In the present embodiment, the battery 11 has a battery voltage $V_B$. The battery 11 may be a secondary battery that can be charged and discharge repeatedly, but not limited thereto. The loads 13 refer to terminals receiving electrical energy (power) from the battery 11, such as an LCD backlight, a camera flashlight, a radio frequency module, a USB device, and an audio device.

The system unit 15 typically comprises a central processing unit (CPU) 151, a microprocessor 153, a capacitor and related circuits. However, as the system unit is known in the art of portable electronic devices, configuration and operation thereof is omitted for simplicity. Therein, the capacitor saves power for the system unit 15 to use.

The battery energy manager 17 is electrically connected with the battery 11, the loads 13, and the system unit 15, and detects the battery voltage $V_B$. The battery energy manager 17 has a low-voltage threshold $V_1$ and a cutoff threshold $V_2$. In the present embodiment, the low-voltage threshold $V_1$ and the cutoff threshold $V_2$ refer to different values of the battery voltage. The low-voltage threshold $V_1$ is higher than the cutoff threshold $V_2$. When the battery voltage $V_B$ is equal to or lower than the low-voltage threshold $V_1$, the battery energy manager 17 stops supplying power from the battery 11 to at least one of the loads 13 (such as a camera flashlight or an audio power), and outputs a suspension command S, which makes the system unit 15 perform a suspension process. When the battery voltage $V_B$ is equal to the cutoff threshold $V_2$, the battery energy manager 17 stops supplying power to the loads 13 and the system unit 15.

Still referring to FIG. 1, the battery energy manager 17 comprises a switch 171, a first voltage detecting unit 173, and a second voltage detecting unit 175. The switch 171 is connected with the battery 11 and the system unit 15. When the switch 171 is of a closed circuit, power of the battery 11 is allowed to pass the switch 171 and reach the system unit 15. When the switch 171 is shut down, power of the battery 11 is blocked by the switch 171 from reaching the system unit 15, because the switch 171 now forms an open circuit.

The first voltage detecting unit 173 and the second voltage detecting unit 175 detect the battery voltage $V_B$, respectively. When the battery voltage $V_B$ is equal to or lower than the low-voltage threshold $V_1$, the first voltage detecting unit 173 stops supplying power from the battery 11 to at least one of the loads 13, and outputs a suspension command S to make the system unit 15 perform the suspension process. The second voltage detecting unit 175, when the battery voltage $V_B$ is equal to or lower than the cutoff threshold $V_2$, controls the switch 171 to cut off, so as to form an open circuit between the battery 11 and the system unit 15.

The disclosed battery-driven electronic device 10 further comprises a battery door (not shown) and a battery door detector 19 that is connected with the battery 11. The battery door detector 19 outputs a suspension command S when the battery door is opened. The suspension command S output by the battery door detector 19 works identically to the suspension command S output by the battery energy manager 17, both notifying the system unit 11 to perform the suspension process.

The battery energy manager 17 further comprises an AND gate unit 177, which has an input end 177a and an output end 177b. The input end 177a is connected with system unit 15, the battery door detector 19, and the first voltage detecting unit 173. The output end 177b is connected with the loads 13 and the system unit 15.

With the configuration as described previously, the battery-driven electronic device 10 of the present invention achieves its two major objectives in the way explained below. The two major objectives are maximizing the use of the discharge of the battery 11, and automatically suspension any unsaved data when the battery door 18 is opened for eliminating the risk of data loss.

Figure 2:
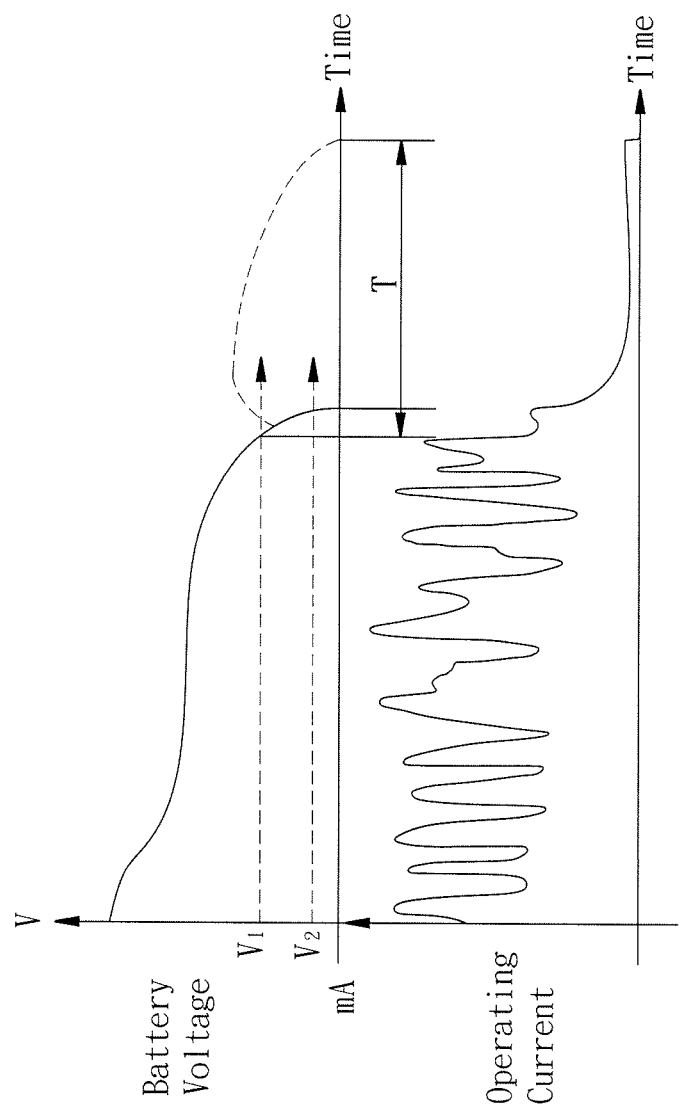
FIGS. 2 and 3 are graphs showing discharging curves of the battery-driven electronic device.

Referring to FIG. 1 and FIG. 2, in the present embodiment, the low-voltage threshold $V_1$ is set as 3V, and the cutoff threshold $V_2$ is set as 2.8 V. In an existing device, when the battery voltage $V_B$ is equal to 3V, there is no power remaining in the battery. When the battery voltage $V_B$ goes down to 2.8 V, the battery-driven electronic device 10 can automatically shut down, and all data running there will be lost without suspension.

Thus, the present invention uses the battery energy manager 17 to detect the battery voltage $V_B$. When the battery voltage $V_B$ is equal to or lower than the low-voltage threshold $V_1$, the battery energy manager 17 stops supplying power to at least one or all of the loads 13 and outputs a suspension command S to notify the system unit 15 to perform the suspension process, where all the running data and software are suspended, thereby preventing data loss.

Therein, as a result of that the battery energy manager 17 stops supplying power to at least one or all of the loads 13, the battery voltage $V_B$ can turn upward as the loads 13 stop consuming power (as indicated by the dotted line in FIG. 2), and this allows the battery voltage $V_B$ to return to higher than 3V, so the battery life T can be extended. The system unit 15 thus is provided with enough power and time to suspend the data. A user may after the system unit 15 completes the data suspension process, replace the battery with a fully charged one and restart the device, so the battery-driven electronic device 10 can resume its operation before battery replacement. At this time, because the battery voltage $V_B$ is turned upward, since the battery voltage $V_B$ stops falling down, the time that the battery energy manager 17 detects the cutoff threshold $V_2$ and shut down the entire device, or stops supplying power to the loads 13 and the system unit 15, can be postponed.

This postponement allows the disclosed battery energy manager 17 to effectively use the most of the discharge of the battery 11, thereby maximizing the life of the battery 11.

While as stated above that the first voltage detecting unit 173 of the battery energy manager 17 serves to, when the battery voltage $V_B$ is equal to or lower than the low-voltage threshold $V_1$, stops powering at least one of the loads 13, it is to be noted that if de-energizing one of the loads 13 is enough to return the battery voltage $V_B$ to above 3V, de-energizing one load 13 is performed, but if the battery voltage $V_B$ would not return to above 3V until two or more or all the loads 13 are shut down, the two or more or all the loads 13 should be turned off. In other words, the number of the loads 13 to be de-energized by the first voltage detecting unit 173 at this stage depends on practical needs and is not limited in the present invention.

Figure 3:
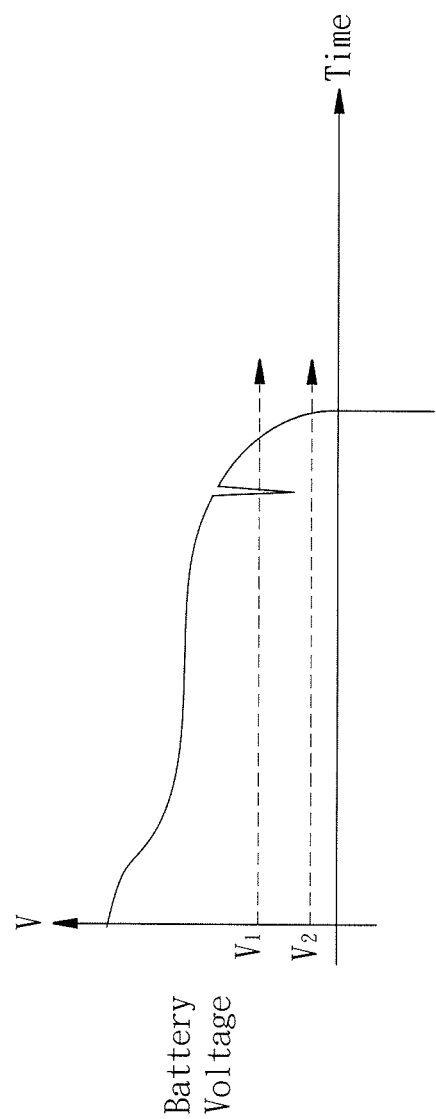

Referring to FIG. 1 and FIG. 3, generally, when fluctuating or showing transient drop due to the operation of the loads 13, the battery voltage $V_B$ may suddenly falls down form a level higher than 3V to a level lower than 2.8V, making the battery energy manager 17 turns off the entire device due to the confirmation that the cutoff threshold $V_2$ is reached. For eliminating such a risk, the disclosed battery energy manager 17 further comprises a filtering unit 179 that is connected between the battery 11 and the first voltage detecting unit 173. In the embodiment, the filtering unit 179 is a capacitor. However, the filtering unit 179 may be alternatively a combination of a resistor, a capacitor and an inductor, without limitation.

With the filtering unit 179 connected between the battery 11 and the first voltage detecting unit 173, transient drop of the battery voltage $V_B$ can be filtered, thereby preventing malfunction from occurrence. As used herein, malfunction refers to the fact that the second voltage detecting unit 175 controls the switch 171 form an open circuit when the battery voltage $V_B$ just transiently becomes lower than the cutoff threshold $V_2$.

However, if the stability of the battery voltage $V_B$ can be secured otherwise, the filtering unit 179 may be omitted.

Then, for preventing any data loss caused by unintentional removal of the battery, the disclosed battery-driven electronic device 10 further comprises a battery door detector 19, as shown in FIG. 1. Generally, the battery 11 can be only removed after a battery door (not shown) is opened, and the battery door detector 19 serves to detect whether the battery door is opened. When the battery door is opened, the battery door detector 19 outputs a suspension command S to direct the system unit 15 to suspend the data running on the device. When the battery 11 is later removed, the battery voltage $V_B$ drops immediately below 2.8V. As a result, the first voltage detecting unit 173 turns off the loads 13 to prevent the loads 13 from using power stored in the capacitor of the system unit 15. The power in the capacitor of the system unit 15 is thus used to perform the suspension process and avoid data loss. At the time the battery 11 is removed, the second voltage detecting unit 175 also detects that the battery voltage $V_B$ is lower than the cutoff threshold $V_2$, so that switch 171 also enters an open-circuit state. In this way, the present invention can effectively prevent data loss due to battery replacement.

Where the battery-driven electronic device uses a non-replaceable battery, meaning that there is not a battery door, the battery door detector and the AND gate unit of the battery energy manager can be omitted.

As compared to the prior portable electronic devices where the low-battery threshold is set at 3.5V, the present invention effectively lowers the threshold to the lowest possible level, namely 0%, thereby maximizing battery life. When it is necessary to replace the battery, the present invention allows the system unit to suspend data timely, thereby eliminating the risk of data loss.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A battery-driven electronic device, comprising:
   a battery, outputting a battery voltage;
   a plurality of loads;
   a system unit; and
   a battery energy manager, being connected with the battery, the loads and the system unit, and detecting the battery voltage, and having a low-voltage threshold and a cutoff threshold, wherein the low-voltage threshold is higher than the cutoff threshold, when the battery voltage is equal to or lower than the low-voltage threshold, the battery energy manager stops supplying power from the battery to at least one of the loads and outputs a suspension command to make the system unit perform a suspension process, and when the battery voltage is equal to or lower than the cutoff threshold, the battery energy manager stops supplying power to the loads and the system unit,
   wherein the battery energy manager comprises a switch, a first voltage detecting unit, and a second voltage detecting unit, the switch is connected with the battery and the system unit, the first voltage detecting unit and the second voltage detecting unit detect the battery voltage, respectively, when the battery voltage is equal to or lower than the low-voltage threshold, the first voltage detecting unit stops supplying power to at least one of the loads and outputs the suspension command, when the battery voltage is equal to or lower than the cutoff threshold, the second voltage detecting unit controls the switch to cut off, so as to form an open circuit between the battery and the system unit.

2. The battery-driven electronic device of claim 1, wherein the battery energy manager further comprises a filtering unit that is connected between the battery and the first voltage detecting unit.

3. The battery-driven electronic device of claim 1, further comprising a battery door and a battery door detector that is connected with the battery and outputs a suspension command when the battery door is opened, so as to make the system unit performs the suspension process.

4. The battery-driven electronic device of claim 3, wherein the battery energy manager further comprises an AND gate unit that has an input end and an output end, the input end is connected with the system unit, the battery door detector and the first voltage detecting unit, and the output end is connected with the loads and the system unit.

* * * * *